June 18, 1929.   T. S. KEMBLE   1,717,511

REMOVABLE GEAR FOR AUTO BUSSES, TRUCKS, ETC

Original Filed July 2, 1924   2 Sheets-Sheet 1

INVENTOR
BY
ATTORNEYS.

June 18, 1929.  T. S. KEMBLE  1,717,511
REMOVABLE GEAR FOR AUTO BUSSES, TRUCKS, ETC
Original Filed July 2, 1924   2 Sheets-Sheet 2
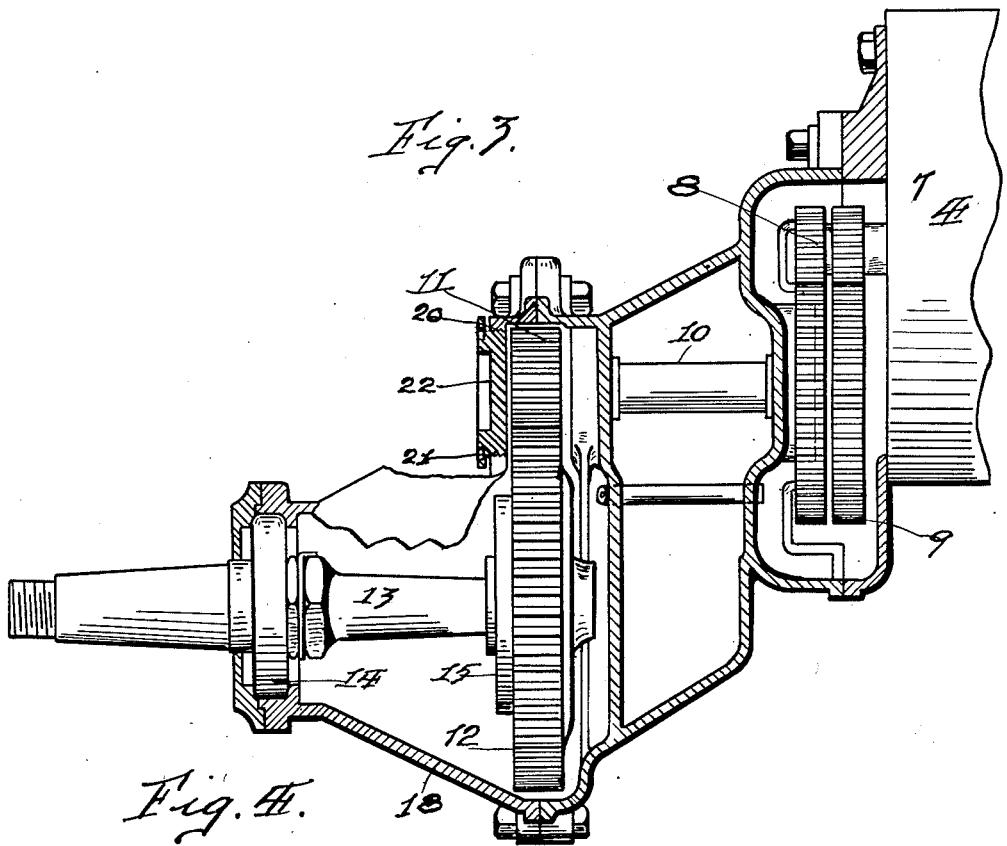
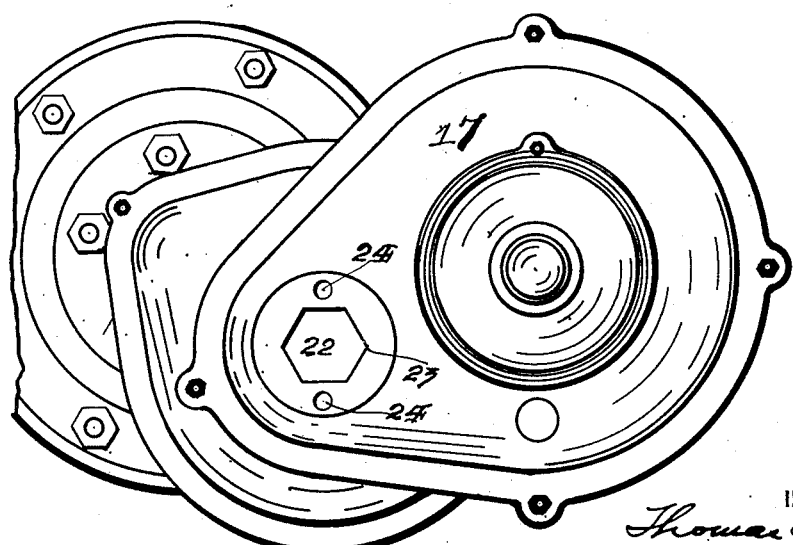
INVENTOR
Thomas S. Kemble
BY
Dodson
ATTORNEYS Patented June 18, 1929.

1,717,511

UNITED STATES PATENT OFFICE.

THOMAS S. KEMBLE, OF LAKEWOOD, OHIO, ASSIGNOR TO UNIVERSAL GAS ELECTRIC COMPANY, OF LAWRENCE, KANSAS, A CORPORATION OF DELAWARE.

REMOVABLE GEAR FOR AUTO BUSSES, TRUCKS, ETC.

Original application filed July 2, 1924, Serial No. 723,772. Divided and this application filed June 13, 1927. Serial No. 198,661.

My invention relates to gear trains for conveying the power of electric motors to the wheels of an auto bus, truck, or similar vehicle, such as is described in my copending application, Serial No. 723,772 filed July 2, 1924, of which this is a division.

In vehicles of this class, it not infrequently happens that one or more of the motors go wrong, through any of the many accidents with which electrical engineers are familiar, such as worn brushes, burned-out armatures or field windings, due to the automatic breaker box sticking or burning. When trouble occurs with one of the motors, the entire vehicle is out of commission until the necessary repairs have been made.

My invention has for its object, to provide a removable gear, so that any one of the entire gear trains may be disconnected without any other disassembling, and so that, although in an extreme case, three of the motors may go wrong, still by the use of my improvement, stoppage of the vehicle for repairs will not be necessary, as each of the damaged motors may be completely disconnected and the vehicle may be operated under low power by one motor alone.

My means of accomplishing the foregoing objects may be more readily understood by having reference to the accompanying drawings, which are hereunto annexed and are a part of this specification, in which—

Fig. 3 is an enlarged detail view, partly in section, showing my invention; and

Fig. 4 is an end elevation of the same.

Similar reference numerals refer to similar parts throughout the entire description.

Figure 1:
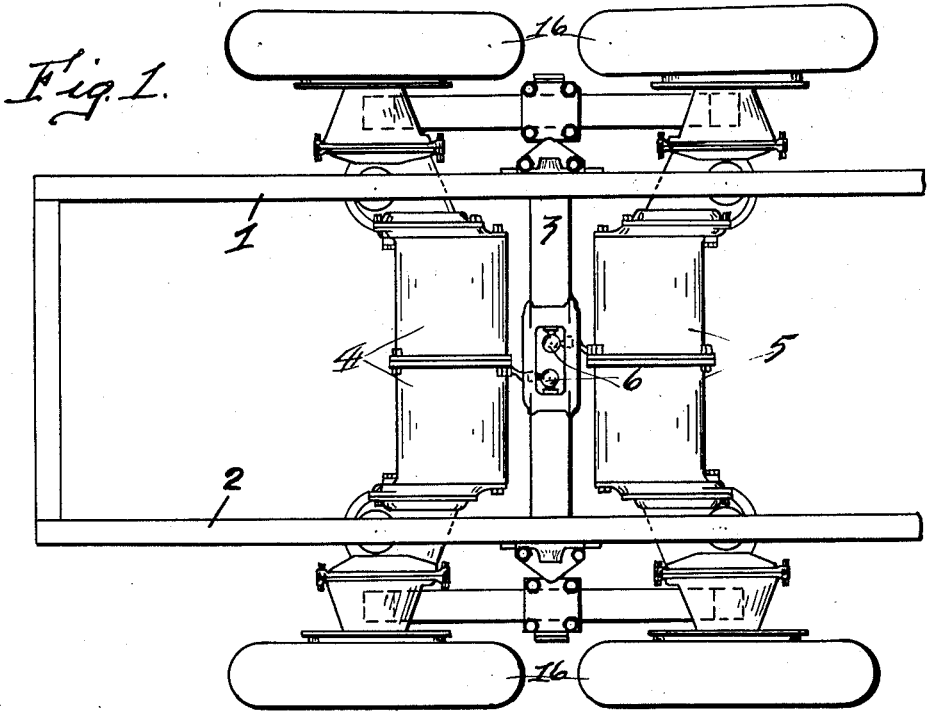
Fig. 1 is a top or plan view of a portion of the chassis of a bus which is driven by two pairs of motors mounted in tandem.
Figure 2:
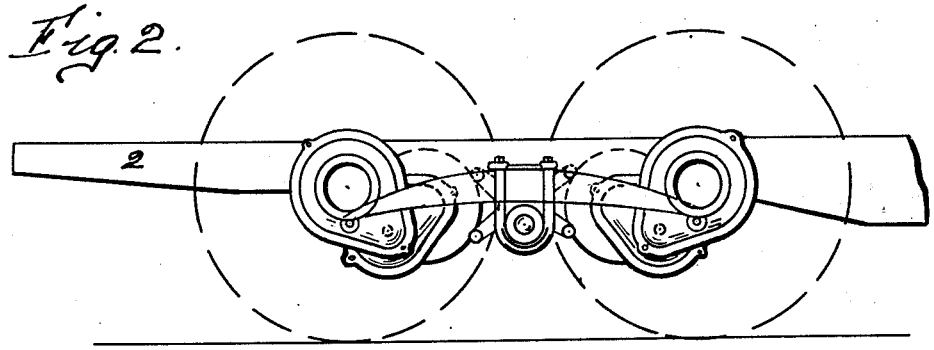
Fig. 2 is a side elevation of the same.

As shown in the drawings, the chassis comprises two side frames 1 and 2, and cross member 3. Two pairs of motors 4 and 5 are secured to the cross member 3 by my torque system 6. The motor shafts 7 are connected to pinions 8 which are in mesh with gears 9 mounted upon the countershaft 10. This shaft 10 carries a pinion 11 which is slidably splined upon said shaft 10. This pinion 11 is in mesh with the main driving gear 12, which is slidably splined upon the live axle 13, which is rotatably mounted in anti-friction bearings 14 and 15. The live axle 13 carries the wheels 16 which may be secured thereto in the usual manner.

The gear trains thus described are enclosed in suitable gear casings; and in the outer wall 17 of the casing 18 which encloses the main driving gear 12 I form an aperture opposite the pinion 11, and sufficiently large to permit the said pinion 11 to pass through it. Internal threads 20 are cut in the wall of the opening, which fit threads 21 cut upon a removable cover plate 22. This plate 22 may be provided with a hexagonal recess 23 for the reception of a wrench, or it may be provided with holes 24 in its periphery to receive a spanner.

It will be apparent from the foregoing that, if any motor is in trouble, by removing the coverplate 22 the pinion 11 may be withdrawn from its countershaft 10, (as it is slidably splined thereon so that it may be easily removed,) and thus disconnect the gear train between the motor 4 and the wheel 16 without disturbing the functioning of the live axle 13 and its bearings 14 and 15, and also without disassembly of motor or gear case other than the removal of plate 22.

It will be obvious, also, that by mounting the main driving gear 12 slidably splined upon the live axle 13, this axle 13 with its outer bearing 14 may be removed without disturbing anything but the cover plate which is detachably secured to the gear casing 18, thus greatly facilitating repairs or replacements on the wheels.

Although I have shown and described specific form and detail for my removable gear, this is done only to show a preferred form of my invention, and I do not wish to be understood as limiting myself to such specific details except as such limitation may be found in the hereinafter contained claims.

Having described my invention, what I regard as new, and desire to secure by Letters Patent of the United States, is:

1. A rear axle formed by two motors in tandem, an eccentric gear casing located close up to and on the inside of the chassis frame, a pinion on the motor shaft, a gear meshing therewith, a countershaft on which said gear is mounted, said shaft being mounted at a lower elevation or plane under said frame, a pinion on the other end of said shaft, a gear in mesh with said last named pinion, a drive axle on which said gear is mounted, a casing for said gears close to the outer side of the frame, an aperture in said casing opposite the pinion on the countershaft, and a detachable cover for said aperture.

2. A rear axle formed by two motors in tandem, an eccentric gear casing located close up to and on the inside of the chassis frame, a pinion on the motor shaft, a gear meshing therewith, a countershaft on which said gear is mounted, said shaft being mounted at a lower elevation or plane under said frame, a pinion on the other end of said shaft, a gear in mesh with said last named pinion, a drive axle on which said gear is mounted, a casing for said gears close to the outer side of the frame, an aperture in said casing opposite the pinion on the countershaft, and a detachable cover for said aperture, said axle being located at a higher elevation than said shaft, said axle being slidably splined in the hub of its gear to permit its withdrawal without removing said gear.

THOMAS S. KEMBLE.